(12) United States Patent
Nozaki et al.

(10) Patent No.: US 12,172,922 B2
(45) Date of Patent: Dec. 24, 2024

(54) METHOD FOR MANUFACTURING CRYSTALLIZED GLASS MEMBER HAVING CURVED SHAPE

(71) Applicant: OHARA INC., Kanagawa (JP)

(72) Inventors: Moriji Nozaki, Kanagawa (JP); Toshitaka Yagi, Kanagawa (JP); Yutaka Yamashita, Kanagawa (JP); Naoyuki Goto, Kanagawa (JP)

(73) Assignee: Ohara Inc., Kanagawa (JP)

( * ) Notice: Subject to any disclaimer, the term of this patent is extended or adjusted under 35 U.S.C. 154(b) by 1247 days.

(21) Appl. No.: 16/092,313

(22) PCT Filed: Mar. 24, 2017

(86) PCT No.: PCT/JP2017/012076
§ 371 (c)(1),
(2) Date: Oct. 9, 2018

(87) PCT Pub. No.: WO2017/179401
PCT Pub. Date: Oct. 19, 2017

(65) Prior Publication Data
US 2021/0206684 A1    Jul. 8, 2021

(30) Foreign Application Priority Data
Apr. 14, 2016    (JP) ................. 2016-081167

(51) Int. Cl.
*C03B 32/02* (2006.01)
*C03B 23/025* (2006.01)
(Continued)

(52) U.S. Cl.
CPC .......... *C03B 32/02* (2013.01); *C03B 23/0252* (2013.01); *C03B 23/0256* (2013.01);
(Continued)

(58) Field of Classification Search
None
See application file for complete search history.

(56) References Cited

U.S. PATENT DOCUMENTS

| | | | |
|---|---|---|---|
| 5,279,635 | A | 1/1994 | Flaugher |
| 2003/0134734 | A1 | 7/2003 | Nishimoto |

(Continued)

FOREIGN PATENT DOCUMENTS

| | | |
|---|---|---|
| CN | 101905952 A | 12/2010 |
| CN | 105314827 A | 2/2016 |

(Continued)

OTHER PUBLICATIONS

JP 2004309021 machine translation, Nagata, Takeshi, Transparent glass pane for stove, Nov. 2004 (Year: 2004).*

(Continued)

*Primary Examiner* — Queenie S Dehghan
(74) *Attorney, Agent, or Firm* — RANKIN, HILL & CLARK LLP

(57) ABSTRACT

A method for manufacturing a crystallized glass member having a curved shape includes a deforming step of deforming at least a portion of a glass plate into a curved shape by an external force that acts on the glass plate while maintaining the temperature of the glass plate within a first temperature range and precipitating crystals from the glass plate. In the method for manufacturing a crystallized glass member having a curved shape according to Claim 1, the first temperature range is from [At−40]° C. to [At+40]° C., wherein At (° C.) is a yield point of the glass plate.

15 Claims, 5 Drawing Sheets

(51) Int. Cl.
  *C03B 23/03*  (2006.01)
  *C03B 25/00*  (2006.01)
  *C03C 10/00*  (2006.01)

(52) U.S. Cl.
  CPC ...... *C03B 23/0305* (2013.01); *C03B 23/0307* (2013.01); *C03B 25/00* (2013.01); *C03C 10/0018* (2013.01); *C03C 10/0054* (2013.01); *C03C 2204/00* (2013.01)

(56) References Cited

U.S. PATENT DOCUMENTS

| | | | |
|---|---|---|---|
| 2010/0129602 A1* | 5/2010 | Dejneka | C03B 11/122 65/106 |
| 2011/0135964 A1 | 6/2011 | Yagi et al. | |
| 2012/0058303 A1* | 3/2012 | Gabel | C03B 23/0305 65/33.1 |
| 2014/0134397 A1 | 5/2014 | Amin et al. | |
| 2015/0284288 A1* | 10/2015 | Ellison | C03C 4/02 65/30.14 |
| 2016/0031736 A1 | 2/2016 | Muehlke et al. | |
| 2017/0281473 A1* | 10/2017 | Takeuchi | A61K 6/74 |

FOREIGN PATENT DOCUMENTS

| | | |
|---|---|---|
| JP | 6049145 | 10/1985 |
| JP | 06508097 | 9/1994 |
| JP | 08104539 | 4/1996 |
| JP | 2003054965 A2 | 2/2003 |
| JP | 2004309021 A2 | 11/2004 |
| JP | 2012091995 A2 | 5/2012 |
| JP | 2014094885 A2 | 5/2014 |
| JP | 2016037424 A2 | 3/2016 |
| JP | 2016169116 A2 | 9/2016 |

OTHER PUBLICATIONS

JP 2002154837 machine translation, Kunimatsu Minoru, Method for Manufacturing Reflector Substrate made of Glass Ceramics, May 2002 (Year: 2002).*
KR 20160143537 machine translation, Momono Kiyoyuki, Crystallized Glass and Crystallized Glass substrate, Dec. 2016 (Year: 2016).*
JP 20050060218 machine translation, Kishi Takayuki, Glass Ceramic, Mar. 2005 (Year: 2005).*
International Search Report dated Jun. 27, 2017 filed in PCT/JP2017/012076.
Report on telephone interviews dated Nov. 24, 2021 regarding the response to the second notice of reasons for refusal of corresponding Chinese Application No. 201780023744.7; English machine translation.
Taiwanese Office Action (TWOA) dated Jun. 2, 2023 issued in Taiwan Patent Application No. 110107431.

* cited by examiner

METHOD FOR MANUFACTURING CRYSTALLIZED GLASS MEMBER HAVING CURVED SHAPE

TECHNICAL FIELD

The present invention relates to a method for manufacturing a crystallized glass member having a curved shape.

BACKGROUND ART

To increase the design flexibility of smartphones, glass members having curved shapes have recently been used for cover glasses and housings of smartphones. In manufacturing such a glass member, it is advantageous in terms of manufacturing cost to form a curved shape by thermally processing a glass plate. Such a glass member needs to be hard to break even when subjected to an impact due to an external cause. For these reasons, glass used for glass members for cover glasses and housings of smartphones is required to have high mechanical strength and excellent thermal processability, and chemically strengthened glass has been commonly chosen. However, the mechanical strength of chemically strengthened glass is not sufficiently high.

Not only chemically strengthened glass, sapphire has also been studied as a material used for cover glasses. Although having high mechanical strength, sapphire is a single crystal, and thus is difficult to form into a curved shape by thermal processing and can be formed into a curved shape only by mechanical processing such as grinding or polishing. Since the machinability of sapphire is much worse than that of glass, it is costly to manufacture a cover glass by using sapphire.

PTL 1 discloses a method for manufacturing a cover glass for a mobile display.

CITATION LIST

Patent Literature

PTL 1: Japanese Unexamined Patent Application Publication No. 2014-94885

SUMMARY OF INVENTION

One material that provides higher mechanical strength than chemically strengthened glass is crystallized glass. Crystallized glass is a material obtained by heating amorphous glass to precipitate numerous crystals inside the glass. As a result of the precipitation of crystals, the physical properties of crystallized glass can be superior to the physical properties of raw glass before the precipitation of crystals. Crystallized glass, which is used in various applications, is manufactured while controlling the precipitation of crystals depending on the intended use.

If a plate of crystallized glass can be formed into a curved shape by thermal processing, an excellent glass member for a cover glass or a housing of a smartphone can be obtained.

However, crystallized glass, in which crystals are precipitated, has poor thermal processability and is difficult to process into a curved shape. Even if crystallized glass is thermally processable, crystallization may proceed due to heating during thermal processing, and in some cases, the crystallized glass may be opacified to lose its transparency. Hence, it has been difficult to achieve both a desired shape and a desired amount of crystal precipitation.

An object of the present invention is to provide, at a low manufacturing cost, a crystallized glass member that has high mechanical strength, that achieves both the shape and the amount of crystal precipitation suitable for the intended use, and that has a curved shape, particularly, to provide, at a low manufacturing cost, a crystallized glass member that is suitable for use as a cover glass or a housing of a smartphone and that has a curved shape.

The inventors conducted intensive studies to find that the above-described problems can be solved by a crystallized glass that can be deformed into a curved shape while precipitating crystals from a glass plate at a controlled crystallization rate during heat treatment, thereby completing the present invention. Specific aspects of the invention are as follows.

(Aspect 1)

A method for manufacturing a crystallized glass member having a curved shape, including a deforming step of deforming at least a portion of a glass plate into a curved shape by an external force that acts on the glass plate while maintaining a temperature of the glass plate within a first temperature range and precipitating a crystal from the glass plate.

(Aspect 2)

The method for manufacturing a crystallized glass member having a curved shape according to Aspect 1, wherein the first temperature range is from $[At-40]°$ C. to $[At+40]°$ C., wherein At (° C.) is a yield point of the glass plate.

(Aspect 3)

The method for manufacturing a crystallized glass member having a curved shape according to Aspect 1 or 2, wherein the glass plate has a composition containing, by mol % on an oxide basis, 30.0% to 70.0% of a $SiO_2$ component,
8.0% to 25.0% of an $Al_2O_3$ component,
0% to 25.0% of a $Na_2O$ component,
0% to 25.0% of a MgO component,
0% to 30.0% of a ZnO component, and
0% to 10.0% of a $TiO_2$ component and a $ZrO_2$ component in total.

(Aspect 4)

The method for manufacturing a crystallized glass member having a curved shape according to Aspect 3, wherein the glass plate has a composition containing, by mol % on an oxide basis, 1% to 10.0% of the $TiO_2$ component.

(Aspect 5)

The method for manufacturing a crystallized glass member having a curved shape according to Aspect 3 or 4, wherein the glass plate has a composition containing, by mol % on an oxide basis, 1% to 10.0% of the $ZrO_2$ component.

(Aspect 6)

The method for manufacturing a crystallized glass member having a curved shape according to any one of Aspects 1 to 5, wherein the glass plate undergoes crystal precipitation at a temperature in a range of $[Tg]°$ C. to $[At+50]°$ C., wherein Tg (° C.) is a glass transition point of the glass plate.

(Aspect 7)

The method for manufacturing a crystallized glass member having a curved shape according to any one of Aspects 1 to 6, wherein in the deforming step, a shaping die is disposed in a direction in which an external force acts on the glass plate, and the glass plate conforms to the shaping die, as a result of which at least a portion of the glass plate is deformed into a curved shape.

(Aspect 8)

The method for manufacturing a crystallized glass member having a curved shape according to any one of Aspects 1 to 7, wherein at least part of the external force is gravity acting on the glass plate.

(Aspect 9)

The method for manufacturing a crystallized glass member having a curved shape according to any one of Aspects 1 to 8, wherein at least part of the external force is a force exerted on the glass plate by a weight placed on an upper surface of the glass plate.

(Aspect 10)

The method for manufacturing a crystallized glass member having a curved shape according to any one of Aspects 1 to 9, wherein at least part of the external force is a force exerted on the glass plate by a pressing member.

(Aspect 11)

The method for manufacturing a crystallized glass member having a curved shape according to any one of Aspects 1 to 10, further including, after the deforming step, a slow cooling step of decreasing the temperature of the deformed glass plate.

(Aspect 12)

The method for manufacturing a crystallized glass member having a curved shape according to any one of Aspects 1 to 11, further including, after the deforming step, a crystallizing step of further precipitating a crystal from the deformed glass plate while maintaining a temperature of the deformed glass plate within a second temperature range.

(Aspect 13)

The method for manufacturing a crystallized glass member having a curved shape according to Aspect 12, further including, after the crystallizing step, a slow cooling step of decreasing the temperature of the deformed glass plate.

(Aspect 14)

A crystallized glass member that has a curved shape and that, when having a thickness of 0.5 mm, has a light transmittance at a wavelength of 410 nm of 86% or more.

According to the present invention, a crystallized glass member that achieves both the shape and the amount of crystal precipitation suitable for the intended use and that has a curved shape can be provided at a low manufacturing cost. The crystallized glass member having a curved shape provided by the present invention has high mechanical strength. The crystallized glass member having a curved shape obtained by the manufacturing method according to the present invention can achieve a high light transmittance in the visible light range.

The crystallized glass member having a curved shape obtained by the manufacturing method according to the present invention is suitable for use as a cover glass of a smartphone, a housing of a smartphone, a cover glass of a timepiece, a HUD (head-up display) substrate for on-vehicle use, a cover glass for a near-infrared sensor, and, in addition, a component of, for example, an electronic device and a mechanical device.

REFERENCE SIGNS LIST

Figure 1:
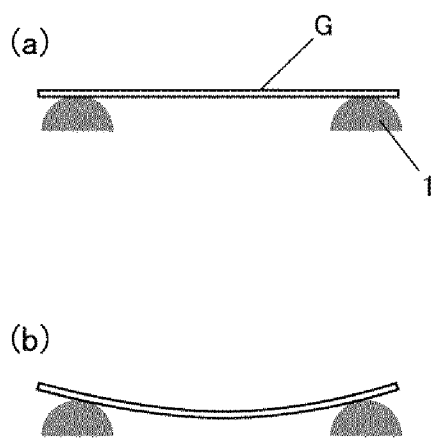
FIG. 1 shows illustrations of an exemplary embodiment of a deforming step of the present invention, as viewed from the direction from which a section of a glass plate is seen. (a) is an illustration before deformation, and (b) is an illustration after deformation.
Figure 2:
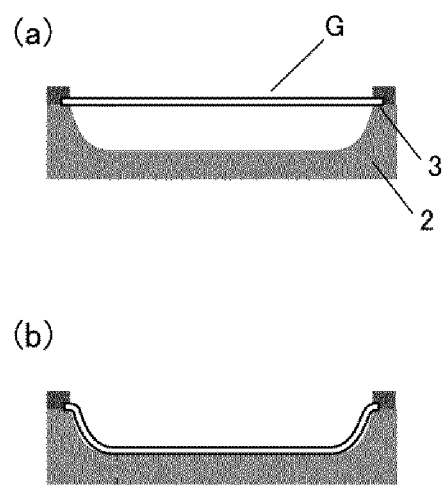
FIG. 2 shows illustrations of an exemplary embodiment of the deforming step of the present invention, as viewed from the direction from which a section of a glass plate is seen. (a) is an illustration before deformation, and (b) is an illustration after deformation.

G glass plate
1 supporting member
2 shaping die
3 marginal portion of shaping die
4 shaping die
5 weight
6 pressing member

DESCRIPTION OF EMBODIMENTS

A method for manufacturing a crystallized glass member having a curved shape according to the present invention includes a deforming step of deforming at least a portion of a glass plate into a curved shape by an external force that acts on the glass plate while maintaining the temperature of the glass plate within a first temperature range and precipitating crystals from the glass plate. The manufacturing method according to the present invention will be described below in detail.

[Step of Preparing Glass Plate]

First, an amorphous glass plate is prepared. The glass plate is preferably shaped so as to be a desired shape or a shape similar to the desired shape after deformation.

The surface of the glass plate may be polished to a mirror finish or may be an as-ground surface.

The material for the glass plate may be a glass that undergoes crystal precipitation upon heating, that is, a raw glass of crystallized glass.

The composition of the raw glass is not particularly limited, but a glass having a composition containing, by mol % on an oxide basis,
- 30.0% to 70.0% of a $SiO_2$ component,
- 8.0% to 25.0% of an $Al_2O_3$ component,
- 0% to 25.0% of a $Na_2O$ component,
- 0% to 25.0% of a MgO component,
- 0% to 30.0% of a ZnO component, and
- 0% to 10.0% of a $TiO_2$ component and a $ZrO_2$ component in total is preferred because such a glass can provide a crystallized glass member having high mechanical strength and a high light transmittance in the visible range and is easily deformed into a curved shape by thermal processing.

The raw glass having the above composition becomes a crystallized glass having at least one crystal phase selected from $RAl_2O_4$, $RTi_2O_5$, $R_2TiO_4$, $R_2SiO_4$, $RAl_2Si_2O_8$, and $R_2Al_4Si_5O_{18}$ (where R is at least one selected from Zn, Mg, and Fe) as a result of crystallization.

For the $SiO_2$ component, the lower limit thereof is more preferably 50%, and the upper limit thereof is more preferably 65%.

For the $Al_2O_3$ component, the lower limit thereof is more preferably 8%, and the upper limit thereof is more preferably 16%.

For the $Na_2O$ component, the lower limit thereof is more preferably 3%, and the upper limit thereof is more preferably 17%.

For the MgO component, the upper limit thereof is more preferably 15%.

For the ZnO component, the upper limit thereof is more preferably 16%.

For the total content of the $TiO_2$ component and the $ZrO_2$ component, the lower limit thereof is more preferably 0.5%, and the upper limit thereof is more preferably 10%, most preferably 6%.

To be easily deformed into a curved shape by thermal processing and to provide a crystallized glass member having high mechanical strength and a high light transmittance in the visible range, the raw glass may be configured as described below in addition to having the above composition.

The composition of the raw glass may contain 1% to 10.0% of the $TiO_2$ component.

The composition of the raw glass may contain 1% to 10.0% of the $ZrO_2$ component.

In the composition of the raw glass, the molar ratio of components $[Al_2O_3/(MgO+ZnO)]$ expressed on an oxide basis may be 0.5 or more and 2.0 or less.

In the composition of the raw glass, the molar ratio of components $[TiO_2/Na_2O]$ expressed on an oxide basis may be 0 or more and 0.41 or less.

In the composition of the raw glass, the molar ratio of components $[MgO/Na_2O]$ expressed on an oxide basis may be 0 or more and 1.60 or less.

In the composition of the raw glass, the molar ratio of components $[ZnO/MgO]$ expressed on an oxide basis may be 0 or more and 1.50 or less.

In the composition of the raw glass, the total content of the MgO component and the ZnO component may be 1.0% or more and 30.0% or less by mol % on an oxide basis.

The composition of the raw glass may contain
- 0% to 25.0% of a $B_2O_3$ component,
- 0% to 10.0% of a $P_2O_5$ component,
- 0% to 20.0% of a $K_2O$ component,
- 0% to 10.0% of a CaO component,
- 0% to 10.0% of a BaO component,
- 0% to 8% of a FeO component,
- 0% to 10.0% of a $ZrO_2$ component,
- 0% to 5.0% of a $SnO_2$ component,
- 0% to 10.0% of a $Li_2O$ component,
- 0% to 10.0% of a SrO component,
- 0% to 3% of a $La_2O_3$ component,
- 0% to 3% of an $Y_2O_3$ component,
- 0% to 5% of a $Nb_2O_5$ component,
- 0% to 5% of a $Ta_2O_5$ component, and
- 0% to 5% of a $WO_3$ component.

The glass plate preferably undergoes crystal precipitation at a temperature in the range of $[Tg]°$ C. to $[At +50]°$ C., wherein Tg (° C.) is a glass transition point of the glass plate and At (° C.) is a yield point of the glass plate. If the glass plate undergoes crystal precipitation in this temperature range, a crystallized glass member having a curved shape is easily obtained by the manufacturing method according to the present invention. To easily obtain a crystallized glass member having a curved shape by the manufacturing method according to the present invention, the glass plate more preferably undergoes crystal precipitation in the temperature range of $[At-20]°$ C. to $[At+20]°$ C.

The glass plate is produced, for example, as described below. Specifically, raw materials are uniformly mixed together such that the contents of the above-described components are within predetermined ranges. The mixed raw materials are placed in a platinum or quartz crucible and melted in an electric furnace or a gas furnace at a temperature in the range of 1300° C. to 1540° C. for 5 to 24 hours to provide a molten glass, and the molten glass is homogenized by stirring. The mixed raw materials may be melted in a firebrick tank furnace to provide a molten glass. Thereafter, the molten glass is cooled to an appropriate temperature and then cast in a mold into a block or column shape. The glass formed into a block or column shape is slowly cooled and then subjected to cut processing and grinding processing, whereby the glass is formed into a plate shape. Alternatively, the glass plate may be produced by directly forming the molten glass that has been homogenized by stirring into a plate shape by using a process such as a float process or a slit down-draw process, followed by slow cooling.

[Deforming Step]

The deforming step is a step of deforming at least a portion of a glass plate into a curved shape by an external force that acts on the glass plate while maintaining the temperature of the glass plate within a first temperature range and precipitating crystals from the glass plate. This step is essential for the present invention.

The glass plate prepared is heated in a furnace such that a portion of the glass plate is supported or held. By supporting or holding not the whole glass plate but a portion thereof, the glass plate softened by heating is deformed into a curved shape due to an external force acting thereon.

In the furnace, the temperature of the glass plate is maintained within the first temperature range.

The first temperature range is preferably from $[At-40]°$ C. to $[At+40]°$ C., wherein At (° C.) is a yield point of the glass plate, because in this range, the glass plate can be deformed into a curved shape while precipitating crystals from the glass plate. The lower limit of the first temperature range is preferably not less than $[Tg]°$ C., wherein Tg (° C.) is a glass transition point of the glass plate. The lower limit of the first temperature range is more preferably $[At-30]°$ C., most preferably $[At-20]°$ C. The upper limit of the first temperature range is more preferably $[At+30]°$ C., most preferably $[At+20]°$ C.

When the raw glass contains, by mol % on an oxide basis,
30.0% to 70.0% of the $SiO_2$ component,
8.0% to 25.0% of the $Al_2O_3$ component,
0% to 25.0% of the $Na_2O$ component,
0% to 25.0% of the MgO component,
0% to 30.0% of the ZnO component, and
0% to 10.0% of the $TiO_2$ component and the $ZrO_2$ component, the first temperature range is preferably from 705° C. to 790° C. When the first temperature range is within this range, the glass plate is easily deformed so as to have a curved shape. In addition, when the first temperature range is within this range, the amount of crystal precipitation tends to be achieved that provides a high light transmittance in the visible range and that, at the same time, provides high mechanical strength. The lower limit of the first temperature range is more preferably 715° C., most preferably 720° C. Similarly, the upper limit of the first temperature range is more preferably 780° C., most preferably 770° C.

Each (a) in FIG. 1 to FIG. 6 illustrates an embodiment in which a portion of the glass plate before deformation is supported or held in the above-described furnace. As illustrated, by supporting a portion of the glass plate, the glass plate can be deformed so as to have a curved shape due to an external force acting on the glass plate.

In the embodiment shown in FIG. 1(a), edge portions of the glass plate are supported by support members 1.

In the embodiment shown in FIG. 2(a), edge portions of the glass plate are held by marginal portions of a shaping die 2.

In each of the embodiments shown in FIG. 3(a) and FIG. 4(a), edge portions of the glass plate are supported by the marginal portions of the shaping die 2 having a concave shape.

In the embodiment shown in FIG. 5(a), edge portions of the glass plate are supported by the shaping die 2 having a concave shape on a slanting surface forming the concave shape. This embodiment is preferred in that edges of the marginal portions of the shaping die 2 will not come into contact to roughen the surface texture of the edge portions of the glass plate.

In the embodiment shown in FIG. 6(a), the central part of the glass plate is supported on the central part of a shaping die 4 having a convex shape.

The external force that acts on the glass plate may be gravity, a force exerted on the glass plate by a weight placed on the upper surface of the glass plate, a force exerted on the glass plate by a pressing member, or a resultant of these forces. In other words, at least part of the external force may be gravity, a force exerted on the glass plate by a weight placed on the upper surface of the glass plate, or a force exerted on the glass plate by a pressing member.

FIG. 1, FIG. 2, FIG. 5, and FIG. 6 each show an embodiment in which the glass plate is deformed by gravity acting on the glass plate.

Figure 4:
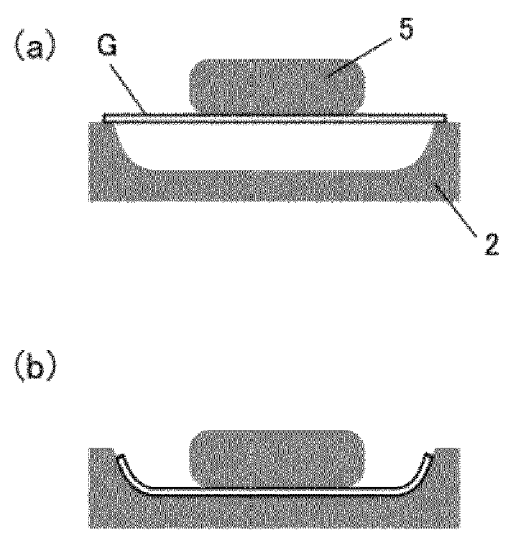
FIG. 4 shows illustrations of an exemplary embodiment of the deforming step of the present invention, as viewed from the direction from which a section of a glass plate is seen. (a) is an illustration before deformation, and (b) is an illustration after deformation.
Figure 5:
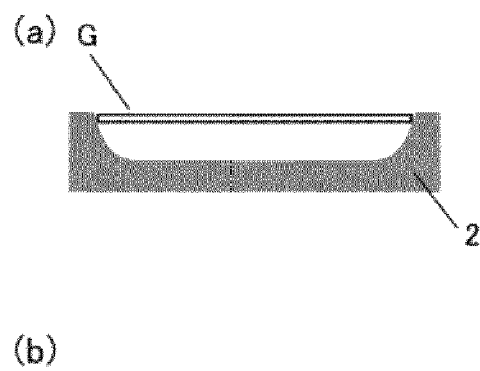
FIG. 5 shows illustrations of an exemplary embodiment of the deforming step of the present invention, as viewed from the direction from which a section of a glass plate is seen. (a) is an illustration before deformation, and (b) is an illustration after deformation.
Figure 6:
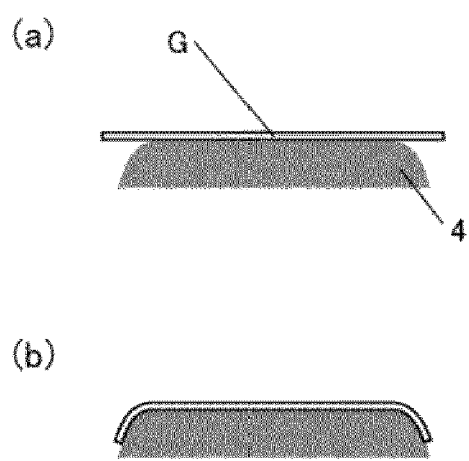
FIG. 6 shows illustrations of an exemplary embodiment of the deforming step of the present invention, as viewed from the direction from which a section of a glass plate is seen. (a) is an illustration before deformation, and (b) is an illustration after deformation.

FIG. 4 shows an embodiment in which a force exerted on the glass plate by a weight 5 placed on the upper surface of the glass plate contributes to deforming the glass plate. The weight 5 exerts the force on the glass plate due to the action of gravity.

The material for the weight can be selected, for example, from sintered bodies and cemented carbides composed mainly of SiC, carbon, NiCrAl alloy, ductile cast iron, stainless steel, and tungsten. A surface of the weight that comes into contact with the glass plate is preferably provided, for example, with a carbon-containing film, such as a diamond-like carbon film, a hydrogenated amorphous carbon film (a-C:H film), a hard carbon film, or a tetrahedral amorphous carbon film (taC film), or with a noble metal alloy film because a crystallized glass member with a smooth surface texture is easily obtained and fusion of the weight to the crystallized glass member is easily prevented.

The shape of the weight is preferably such that transferring the shape provides the crystallized glass member with a desired shape.

Figure 3:
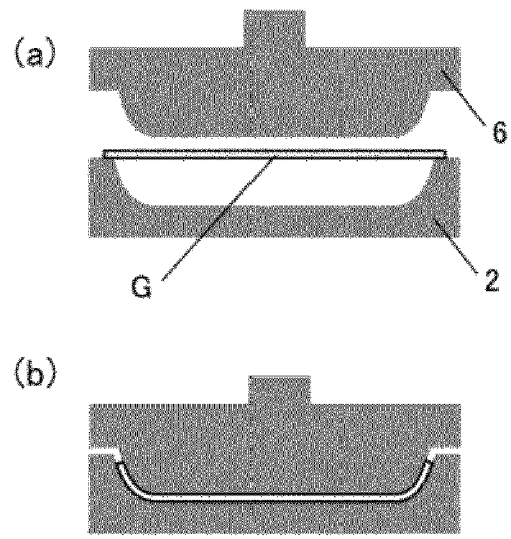
FIG. 3 shows illustrations of an exemplary embodiment of the deforming step of the present invention, as viewed from the direction from which a section of a glass plate is seen. (a) is an illustration before deformation, and (b) is an illustration after deformation.

FIG. 3 shows an embodiment in which a force exerted by a pressing member 6 contributes to deforming the glass plate. The pressing member 6 receives a force generated by a power source, which is not shown, and exerts the force on the glass plate.

The material for the pressing member can be selected, for example, from sintered bodies and cemented carbides composed mainly of SiC, carbon, NiCrAl alloy, ductile cast iron, stainless steel, and tungsten. The material for the pressing member preferably has high heat resistance. A surface of the pressing member that comes into contact with the glass plate is preferably provided, for example, with a carbon-containing film, such as a diamond-like carbon film, a hydrogenated amorphous carbon film (a-C:H film), a hard carbon film, or a tetrahedral amorphous carbon film (taC film), or with a noble metal alloy film because a crystallized glass member with a smooth surface texture is easily obtained and fusion of the pressing member to the crystallized glass member is easily prevented.

The shape of the pressing member is preferably such that transferring the shape provides the crystallized glass member with a desired shape.

Although the shaping die is not essential, it is preferred that the shaping die be disposed in a direction in which an external force acts on the glass plate to transform at least a portion of the glass plate into a curved shape. This is because when the temperature of the glass plate is within the first temperature range, the glass plate softens and conforms to the shaping die, and as a result, a desired shape is easily obtained. Each (b) in FIG. 2 to FIG. 6 shows an embodiment in which, as a result of conforming to the shaping die, at least a portion of the glass plate has been transformed into a curved shape.

The material for the shaping die can be selected, for example, from sintered bodies and cemented carbides composed mainly of SiC, carbon, NiCrAl alloy, ductile cast iron, stainless steel, and tungsten. The material for the shaping die preferably has high heat resistance. A surface of the shaping die that comes into contact with the glass plate is preferably provided, for example, with a carbon-containing film, such as a diamond-like carbon film, a hydrogenated amorphous carbon film (a-C:H film), a hard carbon film, or a tetrahedral amorphous carbon film (taC film), or with a noble metal alloy film because a crystallized glass member with a smooth surface texture is easily obtained and is also easily released from the die.

The shape of the shaping die is preferably such that transferring the shape provides the crystallized glass member with a desired shape.

The time of the deforming step, that is, the time during which the temperature of the glass plate is maintained within the first temperature range varies depending on the composition of the raw glass and thus may be appropriately adjusted.

When the composition of the raw glass contains, by mol % on an oxide basis,
30.0% to 70.0% of the $SiO_2$ component,
8.0% to 25.0% of the $Al_2O_3$ component, 0% to 25.0% of the $Na_2O$ component,
0% to 25.0% of the MgO component,
0% to 30.0% of the ZnO component, and
0% to 10.0% of the $TiO_2$ component and the $ZrO_2$ component in total, the time of the deforming step is preferably 10 minutes or more and 60 minutes or less. When the time of the deforming step is within this range, the glass plate is easily deformed so as to have a curved shape. When the time of the deforming step is within this range, the amount of crystal precipitation tends to be achieved that provides a high light transmittance in the visible range and that, at the same time, provides high mechanical strength. The time of the deforming step is more preferably 15 minutes or more and 50 minutes or less, still more preferably 15 minutes or more and 45 minutes or less.

[Crystallizing Step]

The crystallizing step is an optional step. The crystallizing step is a step of, after the deforming step, further precipitating crystals from the deformed glass plate while maintaining the temperature of the deformed glass plate within a second temperature range. The crystallizing step may be performed when the amount of crystal precipitation from the glass plate during the deforming step does not reach the desired amount of crystal precipitation for reasons of manufacturing process design. The deformation of the glass plate has been completed in the deforming step. In the crystallizing step, the glass plate will not be deformed, and the amount of crystal precipitation increases.

The upper limit of the second temperature range is lower than the upper limit of the first temperature range.

The second temperature range is preferably [Tg]° C. or higher to promote crystallization and preferably [At]° C. or lower to enable crystals to be precipitated from the glass plate without causing opacification of the material, wherein Tg (° C.) is a glass transition point of the glass plate and At (° C.) is a yield point of the glass plate.

When the composition of the raw glass contains, by mol % on an oxide basis,
30.0% to 70.0% of the $SiO_2$ component,
8.0% to 25.0% of the $Al_2O_3$ component,
0% to 25.0% of the $Na_2O$ component,
0% to 25.0% of the MgO component,
0% to 30.0% of the ZnO component, and
0% to 10.0% of the $TiO_2$ component, the second temperature range is preferably from [Tg]° C. to [At]° C. When the second temperature range is within this range, crystals can be precipitated from the glass plate without causing deformation. More preferably, the second temperature range is from [Tg]° C. to [At−20]° C. to allow the crystallization inside the material to proceed uniformly.

[Slow Cooling Step]

The slow cooling step is a step of removing strain of the deformed glass plate and is performed after the deforming step or the crystallizing step. The slow cooling step is performed by decreasing the temperature of the glass plate that has been through the deforming step or the crystallizing step to a predetermined target temperature at a predetermined cooling rate. The cooling rate is preferably 50° C./hr or more and 200° C./hr or less because at such a cooling rate, strain inside the glass plate can be sufficiently removed and the step does not take an excessively long time. More preferably, the cooling rate is 15° C./hr or more and 80° C./hr or less. The target temperature is preferably [Tg−200]° C. The lower limit of the temperature of slow cooling is preferably [Tg−300]° C., more preferably [Tg−250]° C., still more preferably [Tg−200]° C.

After the slow cooling step, the glass plate is taken out of the furnace and allowed to naturally cool to room temperature.

The temperature conditions and the time conditions in the deforming step and the crystallizing step may be designed such that the specific gravity of the glass plate after the steps of the manufacturing method according to the present invention is a target specific gravity. The target specific gravity is determined by measuring in advance a specific gravity that provides the amount of crystal precipitation for a desired crystallized glass member.

[Chemical Strengthening]

To further increase the mechanical strength of the crystallized glass member having a curved shape obtained by the manufacturing method according to the present invention, a compressive stress layer may be formed. The crystallized glass member having a curved shape obtained by the manufacturing method according to the present invention has high mechanical properties by itself due to precipitated crystals and, in addition, can be provided with higher strength by forming a compressive stress layer.

One exemplary method for forming a compressive stress layer is a chemical strengthening process in which an alkaline component present in a surface layer of the crystallized glass member is allowed to undergo an exchange reaction with an alkaline component having a larger ionic radius to form a compressive stress layer in the surface layer. Alternatively, a thermal strengthening process in which the crystallized glass member is heated and then quenched or an ion implantation process in which ions are implanted into a surface layer of the crystallized glass member may be used.

The chemical strengthening process can be performed, for example, according to the following procedure. The crystallized glass member is brought into contact with or immersed in a molten salt for 0.1 to 12 hours, the molten salt being obtained by heating a salt containing potassium or sodium, such as potassium nitrate ($KNO_3$), sodium nitrate ($NaNO_3$), or a composite salt thereof, to 350° C. to 500° C. This causes an ion-exchange reaction between a lithium component ($Li^+$ ion) or a sodium component ($Na^+$ ion) present in a glassy phase near the surface and a sodium component ($Na^+$ ion) or a potassium component ($K^+$ ion), which is an alkaline component having a larger ionic radius. As a result of this, a compressive stress layer is formed in the surface of the crystallized glass member.

[Crystallized Glass Member]

The crystallized glass member obtained by the manufacturing method according to the present invention, when having a thickness of 0.5 mm, has a light transmittance at a wavelength of 410 mm, including reflection loss, of 86% or more.

EXAMPLES

A crystallized glass member having a curved shape was manufactured using the manufacturing method according to the present invention.

First, a plate of glass serving as a raw glass of the crystallized glass member was manufactured. Raw materials such as oxides, hydroxides, carbonates, nitrates, fluorides, chlorides, hydroxides, and metaphosphoric acid compounds corresponding to raw materials for each component were selected, and these raw materials were weighed out at a composition ratio of each example shown in Table 1 to Table 3 and uniformly mixed together. The mixed raw materials were then placed in a platinum crucible and melted in an electric furnace at a temperature ranging from 1300° C. to 1550° C. for 5 to 24 hours depending on the melt resistance of the glass composition. Thereafter, the molten glass was homogenized by stirring, then cast, for example, in a mold, and slowly cooled to produce a raw glass ingot.

In Tables, the glass transition point of the raw glass is designated as "Glass transition point Tg (° C.)", the yield point as "Yield point At (° C.)", and the specific gravity of the raw glass as "Specific gravity of raw glass".

The ingot produced was cut and ground to provide a 150 mm×70 mm rectangular glass plate having a thickness of 0.55 mm. The glass plate was then polished so as to have a mirror-finished surface. The polished glass plate has a thickness of 0.50 mm.

The glass plate was subjected to the deforming step as shown in FIG. 3. A stainless steel material (SUS 304) was used as a material for a shaping die and a pressing member.

Figure 7:
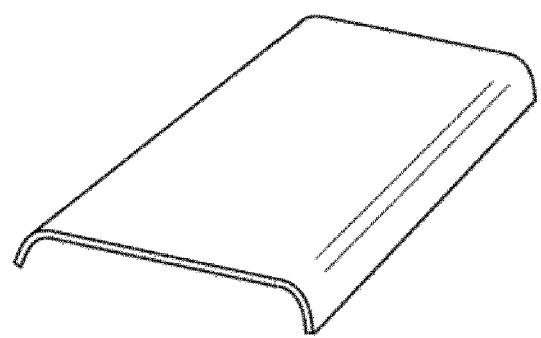
FIG. 7 is a perspective view of an example of a crystallized glass member having a curved shape obtained by the manufacturing method according to the present invention.
Figure 8:
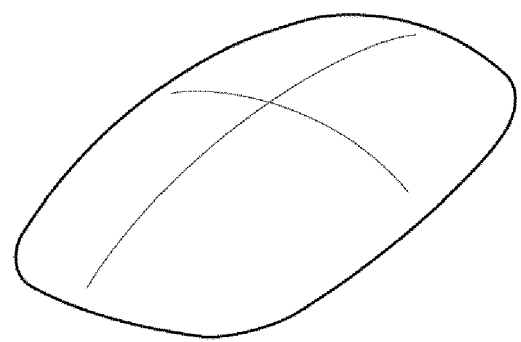
FIG. 8 is a perspective view of an example of a crystallized glass member having a curved shape obtained by the manufacturing method according to the present invention. Crossed lines are auxiliary lines for ease of understanding of the shape.
Figure 9:
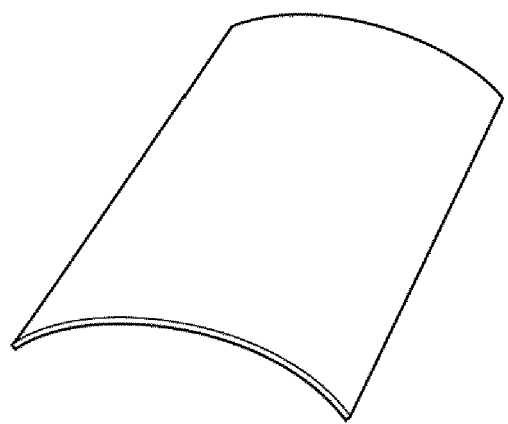
FIG. 9 is a perspective view of an example of a crystallized glass member having a curved shape obtained by the manufacturing method according to the present invention.

The shape of the shaping die is concave to form a crystallized glass member as shown in FIG. 7 and rectangular in plan view. The bottom of the concave portion of the shaping die is 58 mm×160 mm and flat. The depth of the concave portion of the shaping die is 5 mm. Cylindrical inner surfaces having radii of 5 mm extend from long sides of the bottom of the shaping die to form side wall portions of the shaping die.

The shape of the pressing member is a convex shape that pairs with the shape of the shaping die.

The glass plate was placed in a furnace together with the shaping die with long-side edges of the glass plate being supported by long-side edges of the shaping die. In the furnace, a force of 330 gf was exerted on the upper surface of the glass plate with the pressing member. The temperature in the furnace was controlled such that the temperature of the glass plate was within the first temperature range.

In Table 1, the temperature in the furnace during the deforming step is designated as "Temperature (° C.) during deforming step", the time of the deforming step as "Time (min) of deforming step", the temperature in the furnace for the glass plate during the crystallizing step as "Temperature (° C.) during crystallizing step", the time of the crystallizing step as "Time (min) of crystallizing step", the rate of decreasing the furnace temperature during the slow cooling step as "Cooling rate (° C./hr)", the final temperature (target temperature) in the furnace in the slow cooling step as "Target temperature (° C.)", the crystal phase precipitated in the glass plate as "Crystal phase", the specific gravity of the crystallized glass as "Specific gravity of crystallized glass", and the light transmittances, including reflection loss, at wavelengths of 410 nm, 500 nm, and 700 nm of the crystallized glass member (0.50 mm thick) as "Transmittance (410 nm) (%)", "Transmittance (500 nm) (%)", and "Transmittance (700 nm) (%)", respectively. In the table, no temperature data in the "Temperature during crystallizing step" column means that the crystallizing step is not performed.

The glass transition point (Tg) and the yield point (At) of the glass plate were measured in the following manner. A round-bar specimen 50 mm in length and 4±0.5 mm in diameter having the same composition as that of the glass plate was prepared. The specimen was measured for temperature and specimen elongation using a Bruker AXS TD5000SA high-temperature thermal dilatometer in accordance with the Japan Optical Glass Manufacturers' Association Standard JOGIS08-2003 "Measuring Method for Thermal Expansion of Optical Glass". The specimen was under a measuring load of 10 gf in the longitudinal direction. The glass transition point (Tg) was determined in accordance with JOGIS08-2003 from a thermal expansion curve obtained by measuring the temperature and specimen elongation. The yield point was defined as a temperature at which the specimen under the measuring load stops expanding and starts to soften and contract.

The temperature in the furnace is a temperature measured with a thermocouple mounted on the inner wall of the furnace. In a preliminary experiment, the temperature in the furnace was read, and immediately thereafter the temperature of the glass plate in the furnace was measured with a radiation thermometer, as a result of which it was found that the temperature difference was ±3° C. In the examples of the present invention, the temperature in the furnace was measured because the temperature of the glass plate could not be directly measured with a radiation thermometer due to the presence of a shaping die and a pressing member.

Regarding the crystal phase, the precipitated crystal phase in the glass plate after the manufacturing process was identified from the angle of a peak that appeared in an X-ray diffraction pattern obtained using an X-ray diffraction analyzer (X'PERT-MPD manufactured by Philips) and, optionally, by using a TEM EDX (JEM2100F manufactured by JEOL Ltd).

The transmittance was measured using a separately prepared sample corresponding to each example. Specifically, a raw glass having the same composition as that of each example was prepared, formed into a mirror-polished parallel plate having a thickness of 0.5 mm, and heat-treated under the same temperature conditions and time conditions as for the deforming step, the crystallizing step, and the slow cooling step in each example to prepare the sample.

The sample prepared was measured for spectral transmittance in accordance with the Japan Optical Glass Manufacturers' Association Standard JOGISO2-2003 "Measuring Method for Color-Degree of Optical Glass" to determine the transmittances at wavelengths of 410 nm, 500 nm, and 700 nm.

TABLE 1

| mol % | Example 1 | Example 2 | Example 3 | Example 4 |
|---|---|---|---|---|
| $SiO_2$ | 58.4 | 58.4 | 58.4 | 58.4 |
| $P_2O_5$ | | | | |
| $B_2O_3$ | | | | |
| $Al_2O_3$ | 11.6 | 11.6 | 11.6 | 11.6 |
| $K_2O$ | | | | |
| $Na_2O$ | 15.5 | 15.5 | 15.5 | 15.5 |
| MgO | 10.3 | 10.3 | 10.3 | 10.3 |
| CaO | | | | |
| ZnO | | | | |
| $ZrO_2$ | | | | |

TABLE 1-continued

| mol % | Example 1 | Example 2 | Example 3 | Example 4 |
|---|---|---|---|---|
| $TiO_2$ | 4.2 | 4.2 | 4.2 | 4.2 |
| $SnO_2$ | | | | |
| $Sb_2O_3$ | | | | |
| Total | 100 | 100 | 100 | 100 |
| $Al_2O_3$/(MgO + ZnO) | 1.13 | 1.13 | 1.13 | 1.13 |
| $TiO_2$/$Na_2O$ | 0.27 | 0.27 | 0.27 | 0.27 |
| MgO/$Na_2O$ | 0.66 | 0.66 | 0.66 | 0.66 |
| ZnO/MgO | 0 | 0 | 0 | 0 |
| MgO + ZnO | 10.3 | 10.3 | 10.3 | 10.3 |
| Glass transition point Tg (° C.) | 650 | 650 | 650 | 650 |
| Yield point At (° C.) | 747 | 747 | 747 | 747 |
| Specific gravity of raw glass | 2.540 | 2.540 | 2.540 | 2.540 |
| Temperature (° C.) during deforming step | 750 | 730 | 710 | 750 |
| Time (min) of deforming step | 30 | 30 | 30 | 30 |
| Temperature (° C.) during crystallizing step | — | — | 700 | 700 |
| Time (min) of crystallizing step | — | — | 90 | 30 |
| Cooling rate (° C./hr) | 100 | 50 | 300 | 150 |
| Target temperature (° C.) | 450 | 450 | 450 | 450 |
| Crystal phase | $MgAl_2O_4$ $MgTi_2O_4$ | $MgAl_2O_4$ $MgTi_2O_4$ | $MgAl_2O_4$ $MgTi_2O_4$ | $MgAl_2O_4$ $MgTi_2O_4$ |
| Specific gravity of crystallized glass | 2.543 | 2.545 | 2.545 | 2.545 |
| Transmittance (410 nm) (%) | 90.1 | 89.5 | 89.8 | 89.3 |
| Transmittance (500 nm) (%) | 90.5 | 90.3 | 90.3 | 90.1 |
| Transmittance (700 nm) (%) | 91.5 | 91.2 | 91.3 | 91.1 |

TABLE 2

| mol % | Example 5 | Example 6 | Example 7 | Example 8 |
|---|---|---|---|---|
| $SiO_2$ | 58.4 | 58.4 | 61 | 54.78 |
| $P_2O_5$ | | | | 0.5 |
| $B_2O_3$ | | | | |
| $Al_2O_3$ | 11.6 | 11.6 | 12.7 | 14.8 |
| $K_2O$ | | | 2.5 | 2 |
| $Na_2O$ | 15.5 | 15.5 | 7.6 | 11 |
| MgO | 10.3 | 10.3 | 5.9 | |
| CaO | | | | |
| ZnO | | | 8.5 | 14.7 |
| $ZrO_2$ | | | 1.1 | 1 |
| $TiO_2$ | 4.2 | 4.2 | | 1.2 |
| $SnO_2$ | | | 0.7 | |
| $Sb_2O_3$ | | | | 0.02 |
| Total | 100 | 100 | 100 | 100 |
| $Al_2O_3$/(MgO + ZnO) | 1.13 | 1.13 | 0.88 | 1.00 |
| $TiO_2$/$Na_2O$ | 0.27 | 0.27 | 0 | 0.11 |
| MgO/$Na_2O$ | 0.66 | 0.66 | 0.78 | 0 |
| ZnO/MgO | 0 | 0 | 1.44 | |
| MgO + ZnO | 10.3 | 10.3 | 14.4 | 14.7 |
| Glass transition point Tg (° C.) | 650 | 650 | 650 | 640 |
| Yield point At (° C.) | 747 | 747 | 750 | 740 |
| Specific gravity of raw glass | 2.540 | 2.540 | 2.588 | 2.707 |
| Temperature (° C.) during deforming step | 750 | 760 | 730 | 730 |
| Time (min) of deforming step | 30 | 30 | 30 | 30 |
| Temperature (° C.) during crystallizing step | — | — | 700 | 720 |
| Time (min) of crystallizing step | | | 90 | 30 |
| Cooling rate (° C./hr) | 100 | 300 | 300 | 50 |
| Target temperature (° C.) | 450 | 450 | 450 | 440 |
| Crystal phase | $MgAl_2O_4$ $MgTi_2O_4$ | $MgAl_2O_4$ $MgTi_2O_4$ | $ZnAl_2O_4$ $MgAl_2O_4$ | $ZnAl_2O_4$ $MgAl_2O_4$ |
| Specific gravity of crystallized glass | 2.545 | 2.546 | 2.610 | 2.7323 |
| Transmittance (410 nm) (%) | 89.3 | 89.0 | 89.8 | 89.5 |
| Transmittance (500 nm) (%) | 90.1 | 90.0 | 90.3 | 90.1 |
| Transmittance (700 nm) (%) | 91.1 | 91.0 | 91.3 | 91.1 |

TABLE 3

| mol % | Example 9 | Example 10 | Example 11 |
|---|---|---|---|
| $SiO_2$ | 57.68 | 55.38 | 57.608 |
| $P_2O_5$ | 0.6 | 0.5 | |
| $B_2O_3$ | 3.7 | 2.9 | |
| $Al_2O_3$ | 11.2 | 10.5 | 12.697 |
| $K_2O$ | | | 1.664 |
| $Na_2O$ | 4.2 | 4.3 | 11.873 |
| MgO | 12.9 | 10.3 | 5.917 |
| CaO | 1.2 | 1.1 | |
| ZnO | 4 | 10.4 | 8.457 |
| $ZrO_2$ | | | 1.106 |
| $TiO_2$ | 4.5 | 4.6 | |
| $SnO_2$ | | | 0.678 |
| $Sb_2O_3$ | 0.02 | 0.02 | |
| Total | 100 | 100 | 100 |
| $Al_2O_3$/(MgO + ZnO) | 0.66 | 0.51 | 0.88 |
| $TiO_2$/$Na_2O$ | 1.07 | 1.07 | 0 |
| MgO/$Na_2O$ | 3.07 | 2.40 | 0.50 |
| ZnO/MgO | 0.31 | 1.01 | 1.43 |
| MgO + ZnO | 16.9 | 20.7 | 14.374 |
| Glass transition point Tg (° C.) | 670 | 670 | 650 |
| Yield point At (° C.) | 720 | 700 | 733 |
| Specific gravity of raw glass | 2.588 | 2.730 | 2.612 |
| Temperature (° C.) during deforming step | 730 | 710 | 700 |
| Time (min) of deforming step | 30 | 30 | 90 |
| Temperature (° C.) during crystallizing step | — | 700 | 700 |
| Time (min) of crystallizing step | | 30 | 60 |
| Cooling rate (° C./hr) | 100 | 50 | 50 |
| Target temperature (° C.) | 470 | 470 | 450 |
| Crystal phase | $ZnAl_2O4$ $MgAl_2O4$ | $ZnAl_2O_4$ $MgAl_2O_4$ | $ZnAl_2O_4$ $MgAl_2O_4$ |
| Specific gravity of crystallized glass | 2.615 | 2.762 | 2.648 |
| Transmittance (410 nm) (%) | 90 | 89.8 | 90.0 |
| Transmittance (500 nm) (%) | 90.5 | 90 | 90.5 |
| Transmittance (700 nm) (%) | 91.3 | 91.2 | 91.1 |

In Examples 1 to 11, the glass plates were each deformed so as to conform to the shaping die, and crystallized glass members having a curved shape were obtained in short times. In the crystallized glass members obtained, the desired crystal phases were precipitated in the desired crystal amounts, and the crystallized glass members had high light transmittances.

The crystallized glass member obtained in Example 5 was immersed in a $KNO_3$ molten salt at 450° C. for 15 minutes, and a compressive stress layer was formed in the surface of the crystallized glass member by a chemical strengthening process. The thickness of the compressive stress layer was measured using an FSM-6000LE glass surface stress meter manufactured by Luceo Co., Ltd. The compressive stress layer had a thickness of 7 μm and a surface stress of 1010 MPa.

The crystallized glass member obtained in Example 6 was immersed in a $KNO_3$ molten salt at 450° C. for 5 minutes, and a compressive stress layer was formed in the surface of the crystallized glass member by a chemical strengthening process. The thickness of the compressive stress layer was measured using an FSM-6000LE glass surface stress meter manufactured by Luceo Co., Ltd. The compressive stress layer had a thickness of 4 μm and a surface stress of 950 MPa.

The crystallized glass member obtained in Example 4 was immersed in a $KNO_3$ molten salt at 450° C. for 6 hours, and a compressive stress layer was formed in the surface of the crystallized glass member by a chemical strengthening process. The thickness of the compressive stress layer was measured using an FSM-6000LE glass surface stress meter manufactured by Luceo Co., Ltd. The compressive stress layer had a thickness of 58 μm and a surface stress of 1050 MPa.

Several embodiments and/or examples according to the present invention have been described in detail above, but those skilled in the art can readily make various modifications to these exemplary embodiments and/or examples without substantially departing from the novel teachings and effects of the present invention. Therefore, these various modifications are within the scope of the present invention.

The contents of the literatures cited in this description and Japanese Patent Application on which the priority under the Paris Convention of the subject application is based are incorporated herein in their entireties.

The invention claimed is:

1. A method for manufacturing a crystallized glass member having a curved shape, comprising a deforming step of deforming at least a portion of a glass plate into a curved shape by an external force that acts on the glass plate while maintaining a temperature of the glass plate within a first temperature range that is from 705° C. to 790° C. and precipitating a crystal from the glass plate, and after the deforming step, a crystallizing step of further precipitating a crystal from the deformed glass plate while maintaining a temperature of the deformed glass plate within a second temperature range,
   wherein the glass plate is the one in which crystals precipitate at a temperature in a range of [Tg]° C. to [At+50]° C., wherein Tg (° C.) is a glass transition point of the glass plate and At (° C.) is a yield point of the glass plate,
   the upper limit of temperature of the glass plate to complete a crystallization of the glass plate is 790° C., and
   an upper limit of the second temperature range is lower than an upper limit of the first temperature range.

2. The method for manufacturing a crystallized glass member having a curved shape according to claim 1, wherein the first temperature range is from [At−40]° C. to [At+40]° C., wherein At (° C.) is a yield point of the glass plate.

3. The method for manufacturing a crystallized glass member having a curved shape according to claim 1, wherein the glass plate has a composition containing, by mol % on an oxide basis,
   30.0% to 70.0% of a $SiO_2$ component,
   8.0% to 25.0% of an $Al_2O_3$ component,
   0% to 25.0% of a $Na_2O$ component,
   0% to 25.0% of a MgO component,
   0% to 30.0% of a ZnO component, and
   0% to 10.0% of a $TiO_2$ component and a $ZrO_2$ component in total.

4. The method for manufacturing a crystallized glass member having a curved shape according to claim 3, wherein the glass plate has a composition containing, by mol % on an oxide basis,
   1% to 10.0% of the $TiO_2$ component.

5. The method for manufacturing a crystallized glass member having a curved shape according to claim 3, wherein the glass plate has a composition containing, by mol % on an oxide basis,
   1% to 10.0% of the $ZrO_2$ component.

6. The method for manufacturing a crystallized glass member having a curved shape according to claim 1, wherein in the deforming step, a shaping die is disposed in a direction in which an external force acts on the glass plate, and the glass plate conforms to the shaping die, as a result of which at least a portion of the glass plate is deformed into a curved shape.

7. The method for manufacturing a crystallized glass member having a curved shape according to claim 1, wherein at least part of the external force is gravity acting on the glass plate.

8. The method for manufacturing a crystallized glass member having a curved shape according to claim 1, wherein at least part of the external force is a force exerted on the glass plate by a weight placed on an upper surface of the glass plate.

9. The method for manufacturing a crystallized glass member having a curved shape according to claim 1, wherein at least part of the external force is a force exerted on the glass plate by a pressing member.

10. The method for manufacturing a crystallized glass member having a curved shape according to claim 1, further comprising, after the deforming step, a slow cooling step of decreasing the temperature of the deformed glass plate.

11. The method for manufacturing a crystallized glass member having a curved shape according to claim 1, further comprising, after the crystallizing step, a slow cooling step of decreasing the temperature of the deformed glass plate.

12. The method for manufacturing a crystallized glass member having a curved shape according to claim 1, wherein the crystallized glass member has at least one crystal phase selected from $RAl_2O_4$, $RTi_2O_5$, $R_2TiO_4$, $R_2SiO_4$, $RAl_2Si_2O_8$, and $R_2Al_4Si_5O_{18}$ where R is at least one selected from Zn, Mg, and Fe.

13. The method for manufacturing a crystallized glass member having a curved shape according to claim 1, wherein the crystallized glass member is a cover glass of a smartphone.

14. The method for manufacturing a crystallized glass member having a curved shape according to claim 1, wherein the crystallized glass member is a housing of a smartphone.

15. The method for manufacturing a crystallized glass member having a curved shape according to claim 1, wherein the glass plate has a composition consisting of, by mol % on an oxide basis, 30.0% to 70.0% of a $SiO_2$ component,
8.0% to 25.0% of an $Al_2O_3$ component,
0% to 25.0% of a $Na_2O$ component,
0% to 25.0% of a MgO component,
0% to 30.0% of a ZnO component, and
0% to 10.0% of a $TiO_2$ component and a $ZrO_2$ component in total.

* * * * *